(12) United States Patent
Hershey et al.

(10) Patent No.: US 6,548,135 B1
(45) Date of Patent: Apr. 15, 2003

(54) ABSORBENT ARTICLE TABLET

(75) Inventors: Douglas J. Hershey, Hollidaysburg, PA (US); Timothy Ray McMillen, Tyrone, PA (US); R. Douglas Evans, Jr., Everett, PA (US)

(73) Assignee: New Pig Corporation, Tipton, PA (US)

( * ) Notice: Subject to any disclaimer, the term of this patent is extended or adjusted under 35 U.S.C. 154(b) by 102 days.

(21) Appl. No.: 09/737,147

(22) Filed: Dec. 14, 2000

(51) Int. Cl.⁷ .............................................. B32B 9/00
(52) U.S. Cl. ........................ 428/40.1; 2/49.1; 2/49.2; 2/52; 428/41.7; 428/42.1; 428/42.2; 428/42.3; 428/43; 428/192; 428/194; 428/906
(58) Field of Search ..................... 428/40.1, 41.7, 428/42.1, 42.2, 42.3, 43, 192, 194, 906; 283/81; 2/49.1, 49.2, 52

(56) References Cited

U.S. PATENT DOCUMENTS

| | | | |
|---|---|---|---|
| 1,637,485 A | | 8/1927 | Hiering |
| 2,077,664 A | * | 4/1937 | Beardsley ............... 206/57 |
| 2,676,818 A | | 4/1954 | Blumberg |
| 2,755,576 A | * | 7/1956 | Golden ................... 40/10 |
| 2,843,868 A | | 7/1958 | Borgstrom |
| 3,612,264 A | * | 10/1971 | Trunick ................. 206/57 |
| 4,253,260 A | | 3/1981 | Maza et al. |
| 4,279,105 A | | 7/1981 | Cameron |
| 4,412,395 A | | 11/1983 | Markin |
| 4,457,964 A | | 7/1984 | Kaminstein |
| 4,963,406 A | | 10/1990 | Gooding, Jr. et al. |
| 5,010,671 A | | 4/1991 | Stonehouse |
| 5,491,844 A | * | 2/1996 | Kehl ....................... 2/49.1 |
| 5,500,267 A | | 3/1996 | Canning |
| 5,597,418 A | | 1/1997 | Evans, Jr. et al. |
| 5,605,731 A | | 2/1997 | Guasch Pubill |
| 5,621,992 A | | 4/1997 | Mandell et al. |
| 5,743,565 A | | 4/1998 | Zimmanck |
| 5,888,604 A | | 3/1999 | Evans, Jr. et al. |
| 5,930,836 A | * | 8/1999 | Morris .................... 2/49.1 |
| 6,003,257 A | | 12/1999 | Stokes |

* cited by examiner

*Primary Examiner*—Nasser Ahmad
(74) *Attorney, Agent, or Firm*—Buchanan Ingersoll, P.C.

(57) ABSTRACT

An absorbent tablet is provided for the quick and convenient cleanup of persons, dirt, grime, spills, leaks, drips, sprays, etc. The absorbent tablet generally includes a substantially rigid backing sheet and a plurality of absorbent sheets stacked on top of the backing sheet, one on top of the other. Each of the absorbent sheets has absorbent properties for addressing dirt cleanup and liquid cleanup and containment. A binding element binds the backing sheet and the plurality of absorbent sheets together along one edge thereof to form the absorbent tablet. A weakened line is formed in each of the absorbent sheets along the one edge thereof adjacent the binding, enabling individual absorbent sheets to be torn and removed from the tablet. The absorbent tablet may be hung at an appropriate location for use via a hanging element connected to the backing sheet and designed for such purposes.

35 Claims, 12 Drawing Sheets

ABSORBENT ARTICLE TABLET

FIELD OF THE INVENTION

The present invention is directed toward the fields of personal cleanup, and the cleanup and containment of liquid spills, leaks, drips and sprays that occur from time to time and, more particularly, is directed toward absorbent articles that are packaged in a compact form for easy and quick distribution and organizational placement for cleanup purposes.

BACKGROUND OF THE INVENTION

It is essential that managers and workers in settings where there exists a potential for leaks or spills of toxic and non-toxic liquids be prepared to contain the leaks or cleanup the spills. Speed is typically important in a spill or leak situation, and is especially important if the liquid is toxic. It is thus important that an individual be able to locate and obtain an absorbent article quickly in order to contain or cleanup the spill or leak, and minimize any damage resulting therefrom.

Often times when a spill or leak occurs, while an individual may be nearby, they may not have readily available to them an absorbent article with which to cleanup or contain the spill. During the time it takes an individual to locate and obtain an absorbent article and eventually cleanup the spill, property damage and/or personal injury may have already occurred.

Consider a grocery store situation where a liquid or other viscous fluid is spilled in one of the aisles as a result of any of a number of occurrences, including, a leak in a plastic bottle or can, a glass jar or bottle being knocked off a shelf, etc. Typically, a store clerk or other employee must venture into a back area of the store to obtain a mop or other cleaning device with which to cleanup the spill. During this time, other store customers may come across the spill. These individuals may be oblivious to the spill and may slip and fall upon coming into contact with the slick floor surface caused by the spill, potentially resulting in injury to the person and liability to the store owner.

Such safety concerns regarding the quick cleanup of spills are also prevalent in the industrial setting where individuals are working around and with heavy machinery. Quick cleanup of spills is especially important in the industrial setting as accidents caused by such spills may result in serious injury to an individual.

While it may be desirable to store or a place a cleaning device in high traffic areas or other areas in which spills or leaks are likely to occur, often times it is impractical. It may be such that in certain settings space is at a premium, or there may simply not be a convenient place to store the cleaning device near where a spill is likely to occur. In these instances, not only may the cleaning device present an eyesore, but it may also present a health hazard if placed in a location where it may be tripped over, knocked over, slipped on, or otherwise come into contact with an individual.

Speed is also important in the cleanup and containment of spills occurring in personal settings, such as in homes and offices. In addition to the potential for personal injury that may result, spills occurring in these settings may cause damage to upholstery, carpets, important papers/documents, and other personal articles if not quickly contained and/or cleaned up.

The present invention is directed toward overcoming one or more of the above-mentioned problems.

SUMMARY OF THE INVENTION

An absorbent article tablet is provided for the quick and convenient personal cleanup of hands, face, etc., and also for the cleanup of spills, leaks, drips, sprays, etc. The absorbent tablet may generally include a substantially rigid backing sheet and a plurality of sheets stacked on top of the backing sheet, one on top of the other. Each of the sheets has absorbent properties for addressing dirt and liquid cleanup and containment. A binding element binds the backing sheet and the plurality of absorbent sheets together along one edge thereof to form the absorbent tablet. A weakened line is formed in each of the absorbent sheets along the one edge thereof adjacent the binding, enabling individual absorbent sheets to be torn and removed from the tablet. The absorbent tablet may be hung at an appropriate location for use via a hanging element connected to the backing sheet and designed for such purposes.

Each absorbent sheet may be formed from a plurality of ply-sheets bonded to one another by spot welding or other conventional means. In one form, each absorbent sheet may consist of a half-folded or quarter-folded sheet. In this form, each absorbent sheet would have a surface area twice or four-times as large as the surface area of the actual absorbent tablet.

In another form, additional weakened lines, or perforations, are formed in each of the plurality of absorbent sheets, such that portions of each of the plurality of absorbent sheets may be removed from the tablet.

While the absorbent tablet may be of any size to accommodate a particular job application, in most instances the absorbent tablet will include a surface area in the range of 9 to 1600 square inches and a thickness in the range of ⅜ to 2 inches.

The hanging element may include at least one magnet attached to the backing sheet for hanging the absorbent tablet on a ferrous surface or, alternately, may include at least one adhesive strip on the backing sheet for attachment of the absorbent tablet to a number of different surfaces.

Further, the hanging element may include at least one aperture or hole formed in the backing sheet and adapted to receive a corresponding projection at the appropriate location where the absorbent tablet is to be hung. Still further, the hanging element may include a fold-out tab cut into the backing sheet, with the fold-out tab having a hole or an aperture for receiving a corresponding projection at the appropriate location where the absorbent tablet is to be hung.

In one form, the plurality of absorbent sheets include microfibrous sheet materials made from melt blown microfibers. Each of the plurality of absorbent sheets may include indicia thereon. The indicia may be related to a specific job application of the absorbent tablet, may identify the manufacturer of the absorbent tablet, may include other advertisements or promotional logos, may alert an individual of a hazardous condition, or may simply be arbitrary.

It is an object of the present invention to provide a space and time efficient cleaning apparatus for cleaning and containing liquid spills and for personal cleanup purposes.

It is a further object of the present invention to provide a cleaning apparatus designed for convenient out of the way placement or near areas where spills or leaks are present or are likely to occur and/or around workstations and other areas where personal cleanup is necessary.

It is yet a further object of the present invention to provide a cleaning apparatus designed for easy transport to a job site and/or a spill location.

Other aspects, objects and advantages of the present invention can be obtained from a study of the application, the drawings and the appended claims.

DETAILED DESCRIPTION OF THE INVENTION

Figure 1:
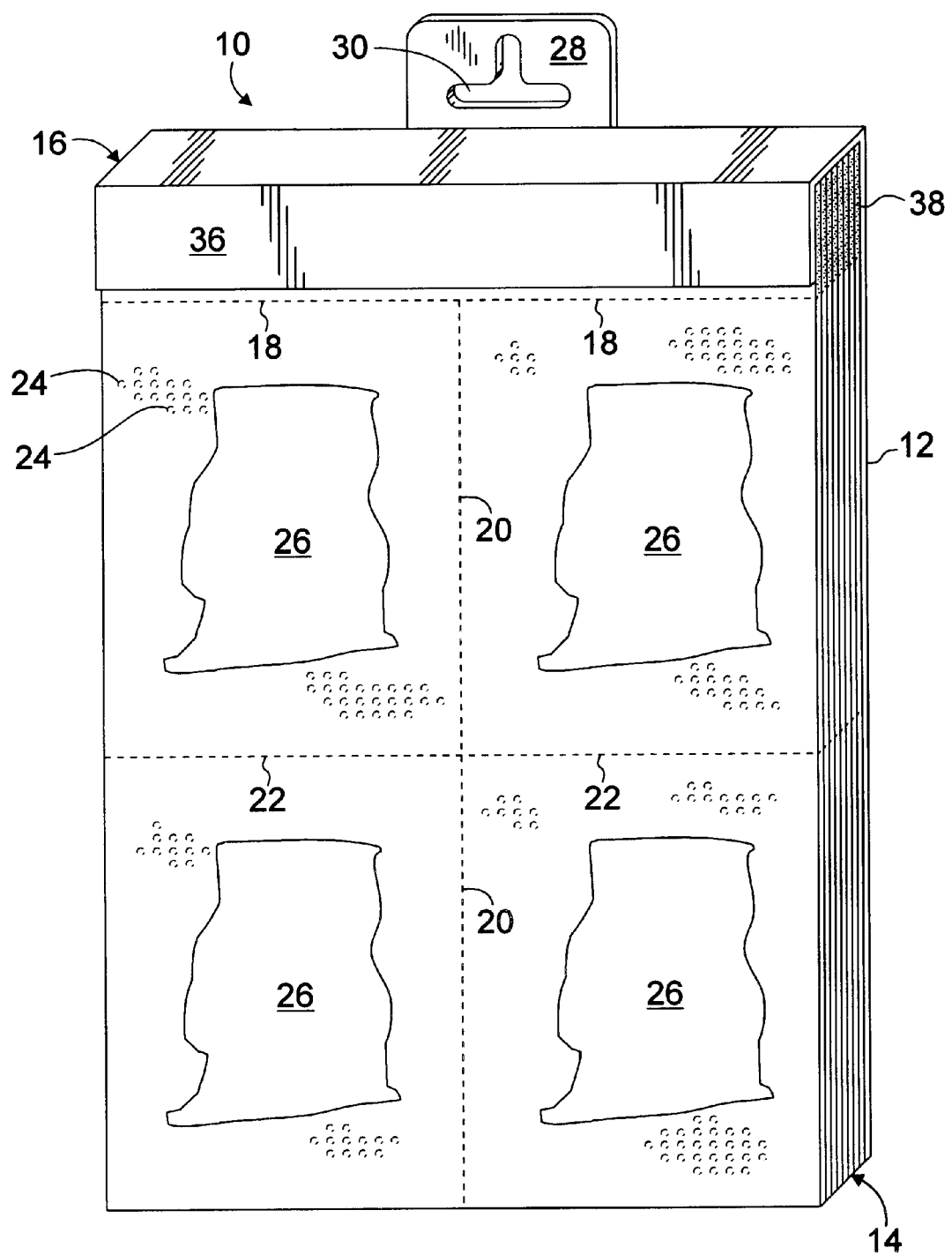
FIG. 1 is a perspective view of the absorbent tablet according to the present invention.

Referring to FIG. 1, an absorbent article tablet according to the present invention is shown generally at 10. The absorbent tablet 10 includes a backing sheet 12 made of a substantially rigid material, such as cardboard and the like, and a plurality of absorbent sheets 14 stacked on top of the backing sheet 12, one on top of the other. The plurality of absorbent sheets 14 and the backing sheet 12 are held together by a binding element 16, defining a spine, which binds the backing sheet 12 and the plurality of absorbent sheets 14 together along one edge thereof to form a tablet. Each individual absorbent sheet 14 is removable along a weakened or perforated line 18 formed in each absorbent sheet 14 along the one edge thereof adjacent to the binding 16.

Additional weakened or perforated lines may be formed in each of the plurality of absorbent sheets 14 to permit portions of each of the absorbent sheets to be removed from the tablet 10. As shown in FIG. 1, additional perforated lines 20 and 22 are formed in the top absorbent sheet 14 enabling a user to remove 1/4, 1/2, 3/4 or all of the absorbent sheet 14 from the tablet 10. The placement and positioning of the various perforated lines formed in each of the absorbent sheets 14 may be consistent throughout the entire tablet 10, or may vary from sheet-to-sheet.

Since the absorbent tablet 10 is designed for use in the quick and easy cleanup of people or personal articles and spills and leaks, each of the plurality of absorbent sheets 14 has moisture absorbent properties. The absorbent sheets 14 may be made from multiple layers of absorbent ply-sheets bonded to one another by spot bonding as shown at 24 in FIG. 1 or by other conventional methods, such as, but not limited to, hot melt or pressure sensitive adhesive, pin bonding, ultrasonic bonding, chemical bonding, thermal bonding, mechanical bonding and fiber entangling. Each ply-sheet may also include multiple layers.

While the absorbent sheets 14 may be made from any material having moisture absorbent properties, in one form, the absorbent sheets 14 are made from microfibrous sheet materials, including melt blown microfibers. The absorbent sheets 14 may include any woven, non-woven, or solid sheet webs made from natural materials such as cellulose, wool, etc., and man-made materials such as polyolefins, polyesters, nylons, glass, etc., or other related materials in any combination that would allow the absorbent sheet 14 to be used to clean, absorb, dike, contain, filter fluids or vapors and/or provide a wear-resistant working surface. In addition, the sheets could be hydrophilic or hydrophobic as required by a particular end use application. Component webs that are naturally hydrophobic can be treated with various surfactants to make them hydrophilic either by surface application and/or by incorporation of the surfactant into the molten polymer stream prior to the non-woven web forming process or, in the case of woven webs, prior to the production of yarns, filaments, etc. For webs that are naturally hydrophilic, surface application of various additives, such as silicon-based products, can be used to make the webs hydrophobic. Particular end use applications may dictate the need for other characteristics, such as, ultraviolet light resistance, fire resistance, static resistance, various colors or tints, etc. These and other characteristics known to those skilled in the art can be achieved by surface application and/or by direct polymer addition.

Each absorbent sheet 14, or portions thereof designed for removal, may include indicia, shown at 26, printed or otherwise included thereon. The indicia 26 may relate to the particular use for which the absorbent tablet 10 is intended, may include advertisements or promotional slogans used by various companies, may be embossed or printed for private labeling purposes, may be individualized to a particular user, or may simply be arbitrary.

Figure 2:
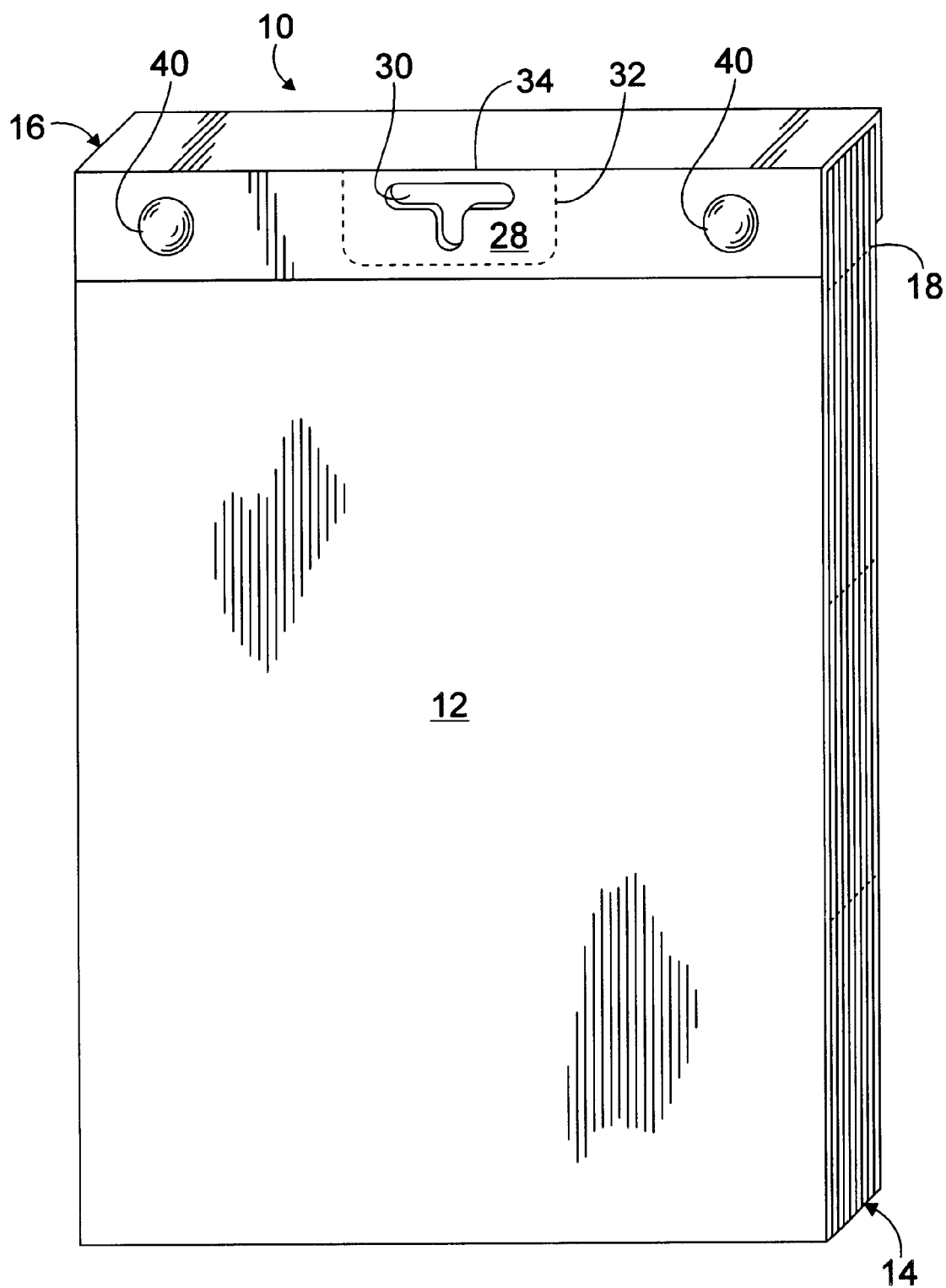
FIGS. 2–9 are perspective and partial perspective views of alternate forms of the absorbent tablet according to the present invention.

The absorbent tablet 10 further includes a hanging element 28 connected to the backing sheet 12 for hanging the absorbent tablet 10 at appropriate locations, such as for example, where spills are prevalent or are likely to occur or where cleanup of persons and articles is necessary. The hanging element 28 includes an aperture 30 for receiving a corresponding projection at the appropriate location where the absorbent tablet 10 is to be hung. As shown in FIGS. 1 and 2, the hanging element 28 is formed from a fold-out tab cut into the backing sheet 12 via score lines 32. With the hanging element 28 in a stored position as shown in FIG. 2, the hanging element 28 generally lies flush with the backing sheet 12. Upon arrival at an appropriate location where the absorbent tablet 10 is to be hung, a user may simply grasp the hanging element 28, tear it front the backing sheet 12 at the score lines 32 and fold the hanging element 28, at a fold line 34, to an in-use position as shown in FIG. 1.

Figure 3:
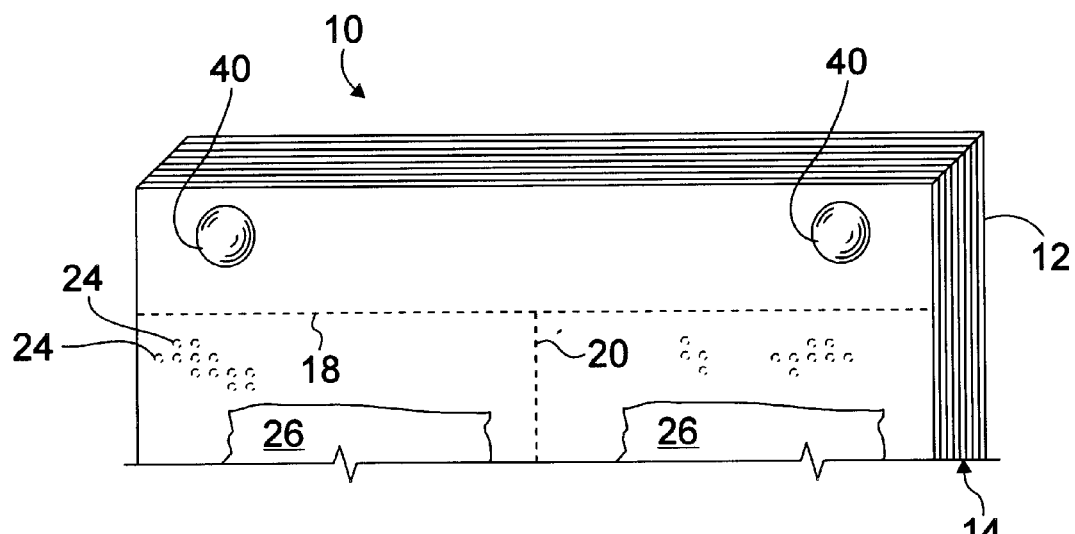

The binding element 16 which binds the backing sheet 12 and the plurality of absorbent sheets 14 together may take a variety of forms. As shown in FIG. 1, the binding element 16 is an extension of the backing sheet 12 which extends around and over the absorbent sheets 14 and presents a folded edge 36 which is adapted to overlie a portion of the overlying absorbent sheets 14. Glue 38, or other types of adhesive, is then provided between the folded edge 36 and the plurality of absorbent sheets 14 along the one edge thereof to bind the backing sheet 12 and the plurality of absorbent sheets 14 together along the binding 16 to form a tablet. Alternately, instead of glue 38, rivets 40 or other attachment mechanisms may be utilized to secure the sheets together along the binding 16 as shown in FIG. 2. The rivets 40 extend through the backing sheet 12, through the plurality of absorbent sheets 14, and through the folded edge 36, and secure the absorbent sheets 14 and backing sheet 12 together to form the absorbent tablet 10. Alternately, the extension of the backing sheet 12 which presents the folded edge 36 may be left out, and the rivets 40 may simply extend through the backing sheet 12 and the plurality of absorbent sheets 14 to define the binding element 16 and secure the absorbent sheets 14 and backing sheet 12 together, as shown in FIG. 3. Further, the backing sheet 12 may be left out altogether and the absorbent tablet 10 formed of only the plurality of absorbent sheets 14 bound together by the binding element 16. Other attachment means may also be utilized instead of the rivets 40, including, but not limited to, staples, pins, screws, wire, etc.

Figure 4:
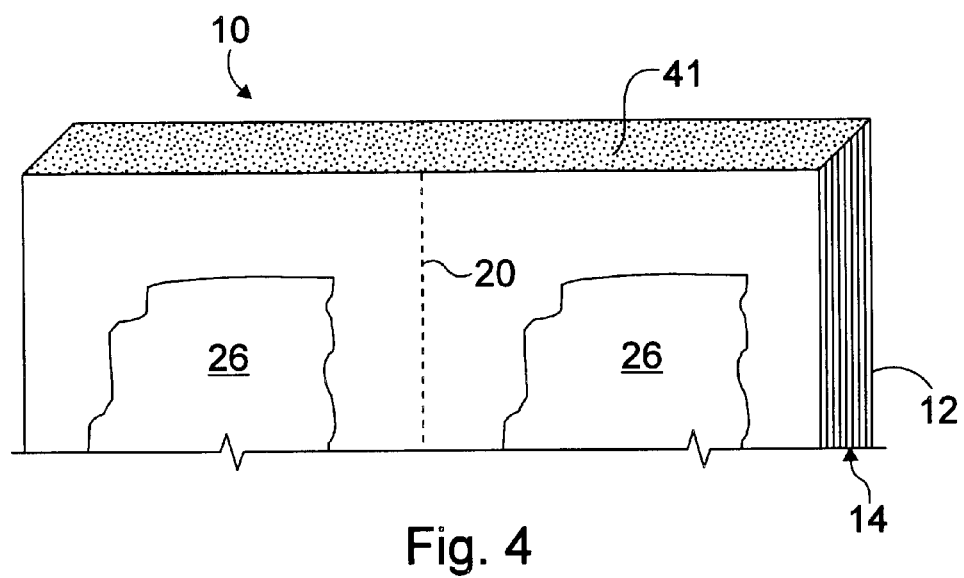
Figure 5:
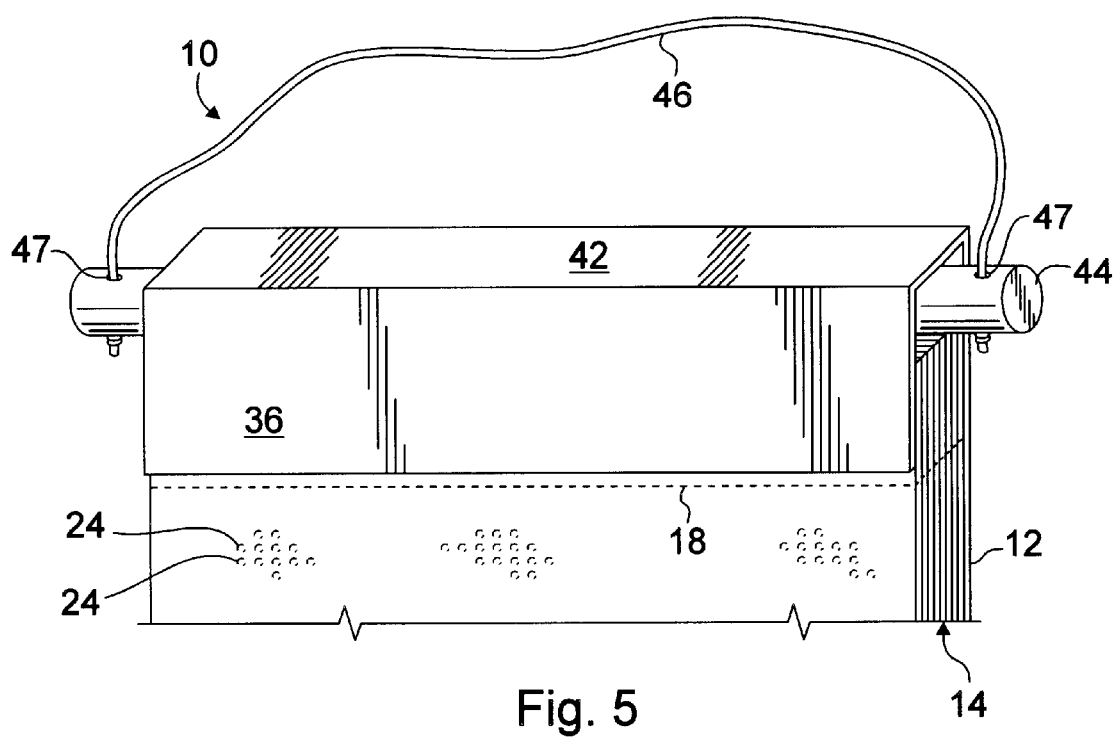

In another form, the backing sheet 12 and the plurality of absorbent sheets 14 are secured together by a strip of glue 41, or other adhesive material, provided on a top edge of the backing sheet 12 and plurality of absorbent sheets 14 and defining the binding element 16, as shown in FIG. 4. In this form, the plurality of absorbent sheets 14 are removed directly from the glue strip 41 and, accordingly, the top perforation 18 is not necessary, In addition to, or in place of, the fold-out hanging element 28 shown in FIGS. 1 and 2, numerous other devices may be utilized to hang the absorbent tablet 10 at an appropriate location. For example, as shown in FIG. 5, in forming the folded edge 36, a space may be left between the top edge of the plurality of absorbent sheets 14 and a top folded portion 42 of the backing sheet 12. A rod 44, made of wood or other material, is inserted through the opening with a string member 46 attached to the rod 44 through holes 47 or other attachment means at either end thereof. The string member 46 is then looped over a projection at an appropriate location where the absorbent tablet 10 is to be hung. It should also be noted that the string member 46 may also be utilized as a convenient carrying handle for the absorbent tablet 10 in transporting the absorbent tablet 10 to an appropriate location.

Figure 6:
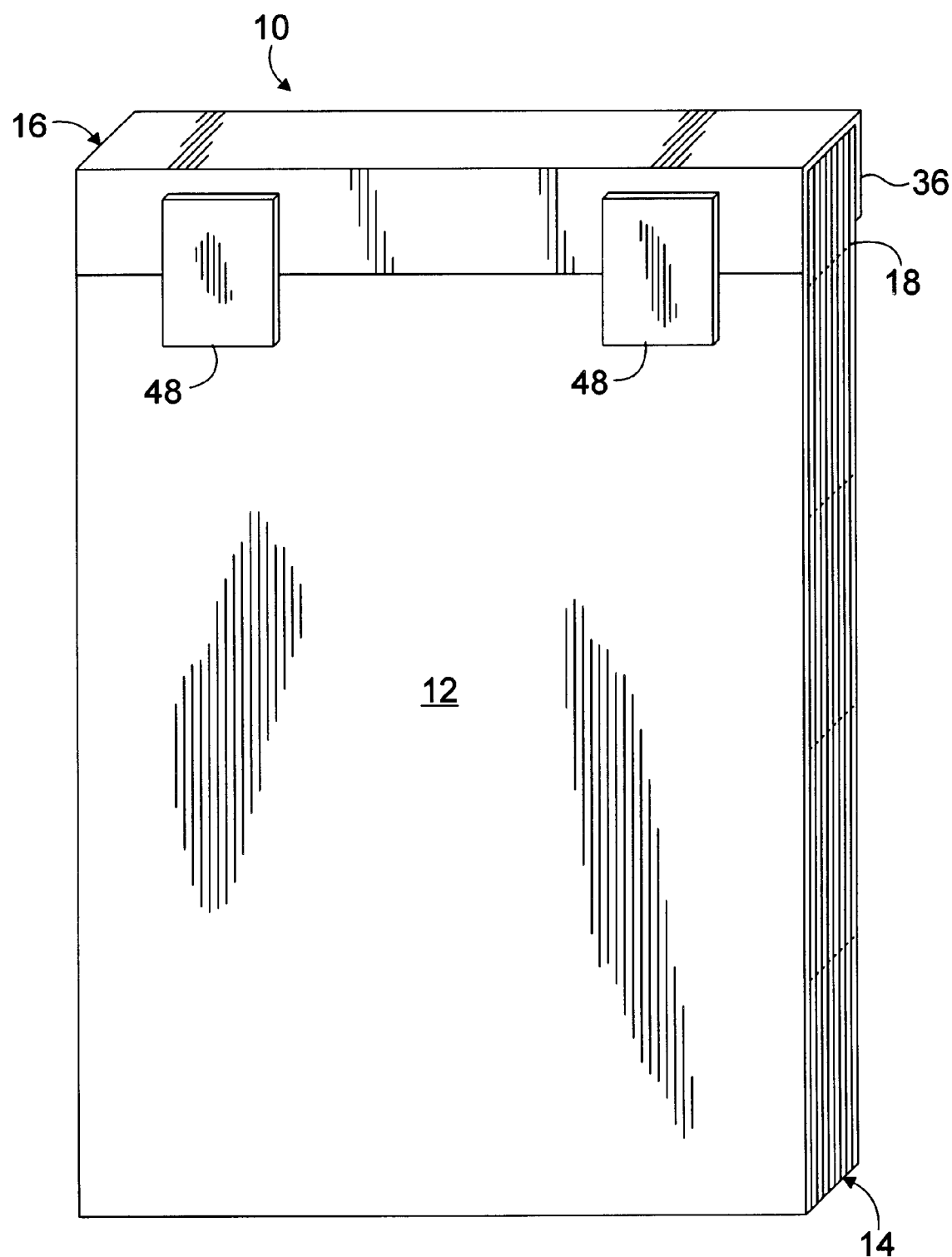

Referring to FIG. 6, one or more magnets 48 may be attached to the backing sheet 12 The magnets 48 permit the absorbent tablet 10, to be hung on a ferromagnetic surface without the need for any projections on such surface. The magnets 48 are chosen, depending upon the size of the absorbent tablet 10, to have sufficient magnetic strength to hold the absorbent tablet 10 up on a vertical surface.

Figure 7:
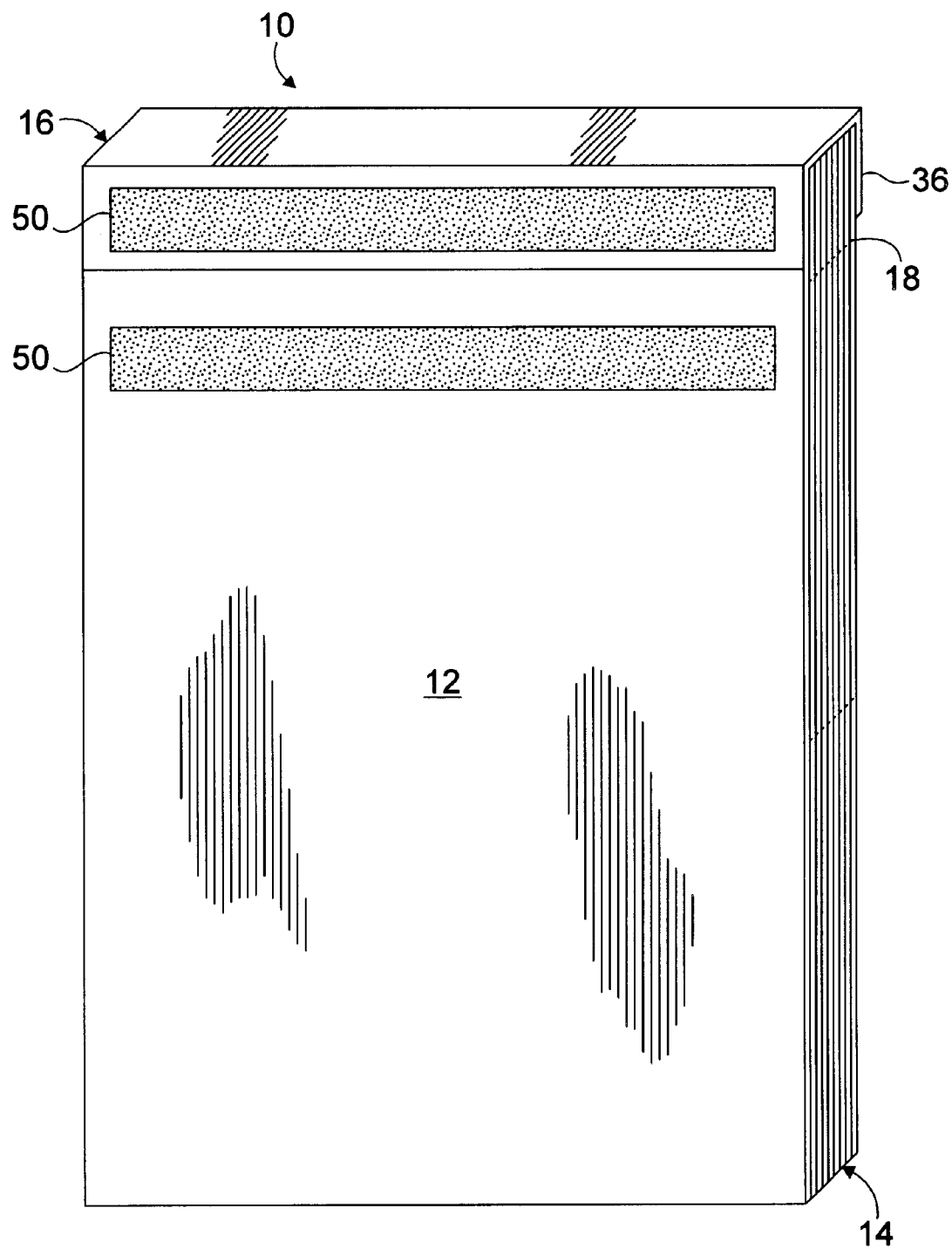

As shown in FIG. 7, one or more adhesive strips 50 are attached to the backing sheet 12 for use in hanging or securing the absorbent tablet 10 at an appropriate location. The adhesive strips 50 may include double-backed tape, or other types of adhesive means, for contacting with a surface and maintaining the absorbent tablet 10 at an appropriate position.

Figure 8:
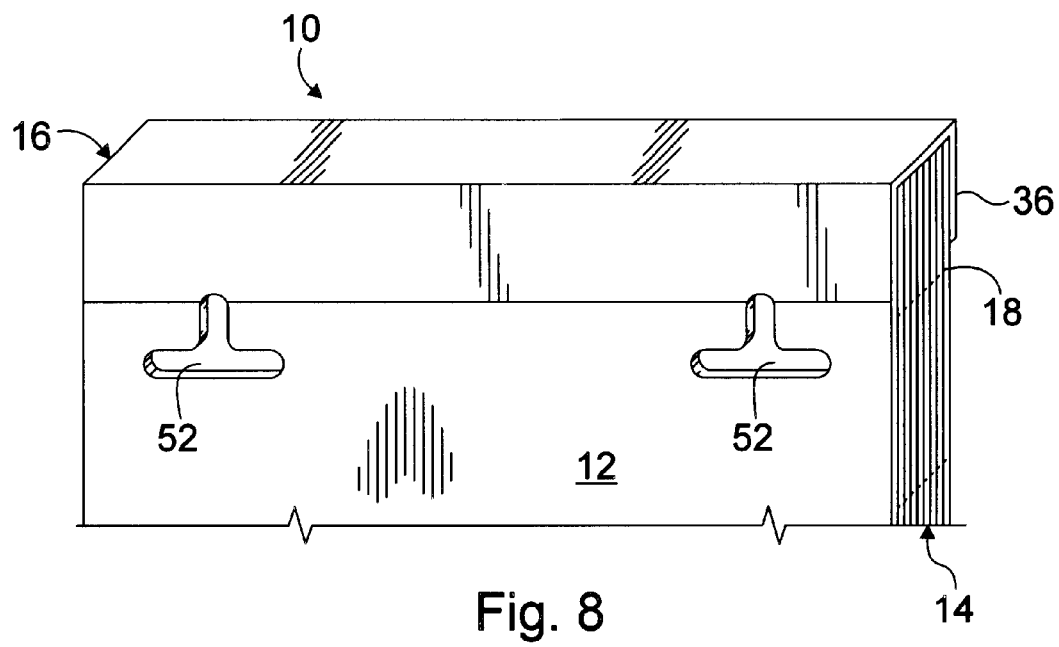

FIG. 8 illustrates a further implementation for hanging the absorbent tablet 10 at appropriate locations. One or more apertures 52, or holes, are cut into the backing sheet 12. The apertures 52 may be of the same general shape as the aperture 30 in the hanging element 28, or may take virtually any shape depending upon the projection upon which the absorbent tablet 10 is to be hung. Alternately, the apertures 52 may extend through the plurality of absorbent sheets 14, thus extending through the entire absorbent tablet 10, and may be disposed either above or below the perforated line 18.

Figure 9:
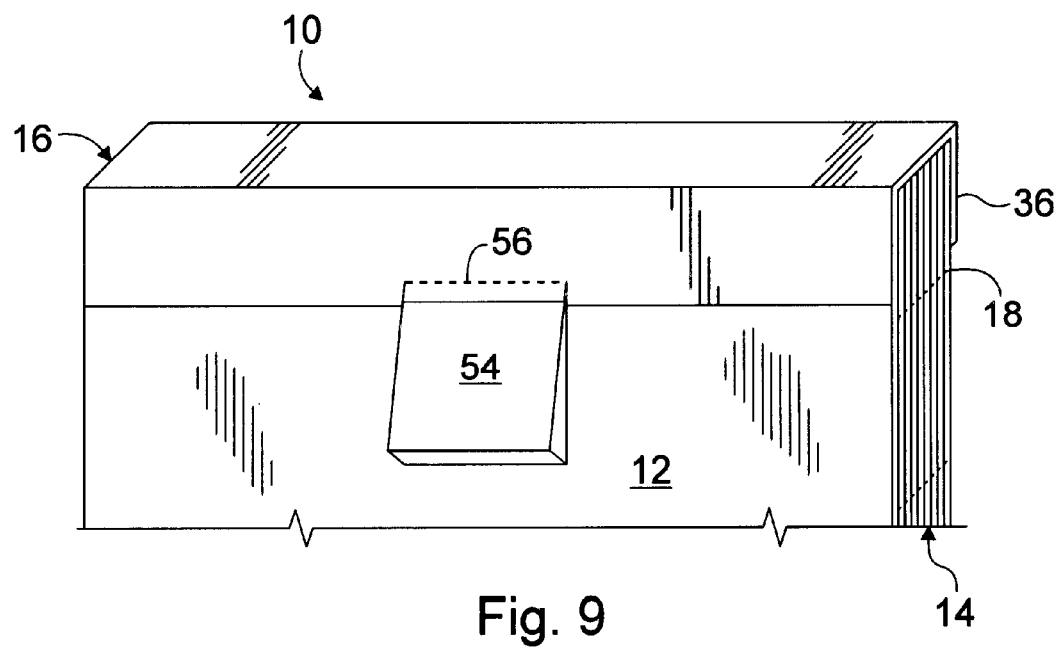

Still further, as shown in FIG. 9, a tab 54, or tabs, may be cut-out in the backing sheet 12. The tab 54 is folded out at a fold line 56 and is inserted into a mating slot (not shown) at an appropriate location where the absorbent tablet 10 is to be hung. It should be noted that instead of having a specific tab 54, or tabs, cut into the backing sheet 12, the entire backing sheet 12 may also be utilized in a similar manner to hang the absorbent tablet 10 at an appropriate location by sliding the backing sheet 12 into a mating slot at an appropriate location where the absorbent tablet 10 is to be hung.

Figure 10:
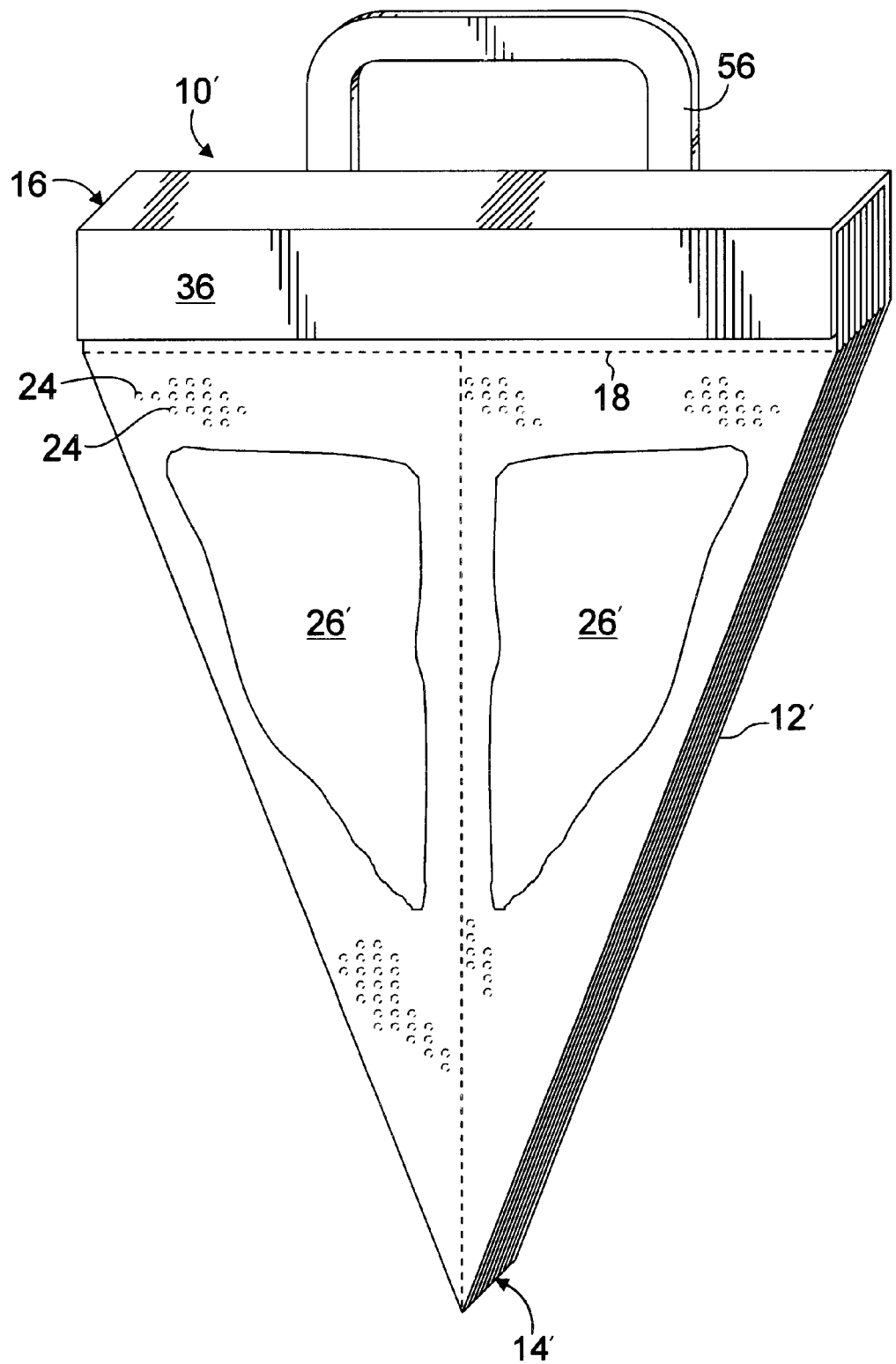
FIG. 10 is a perspective view of an additional embodiment of the absorbent tablet according to the present invention.

It should be understood that the inventive absorbent tablet 10 is not limited to any specific shape. The inventive absorbent table 10 may take any shape, triangular, oval, circular, etc., without departing from the spirit and scope of the present invention. FIG. 10 illustrates the inventive absorbent tablet, shown at 10' in triangular form. The absorbent sheets 14' shown in FIG. 10 include the same properties as the absorbent sheets 14 previously described but are just cut into a different shape. Indicia 26' may also be provided on each of the absorbent sheets 14' as previously described. The absorbent tablet 10' shown in FIG. 10 includes a carrying handle 56 which is designed for easy transport of the absorbent tablet 10' and also may be utilized to hang he absorbent tablet 10' at an appropriate location. The carrying handle 56 may be cut-out from the backing sheet 12' or may be a separate element attached to the backing sheet 12' by adhesive or other conventional attachment means.

Figure 11:
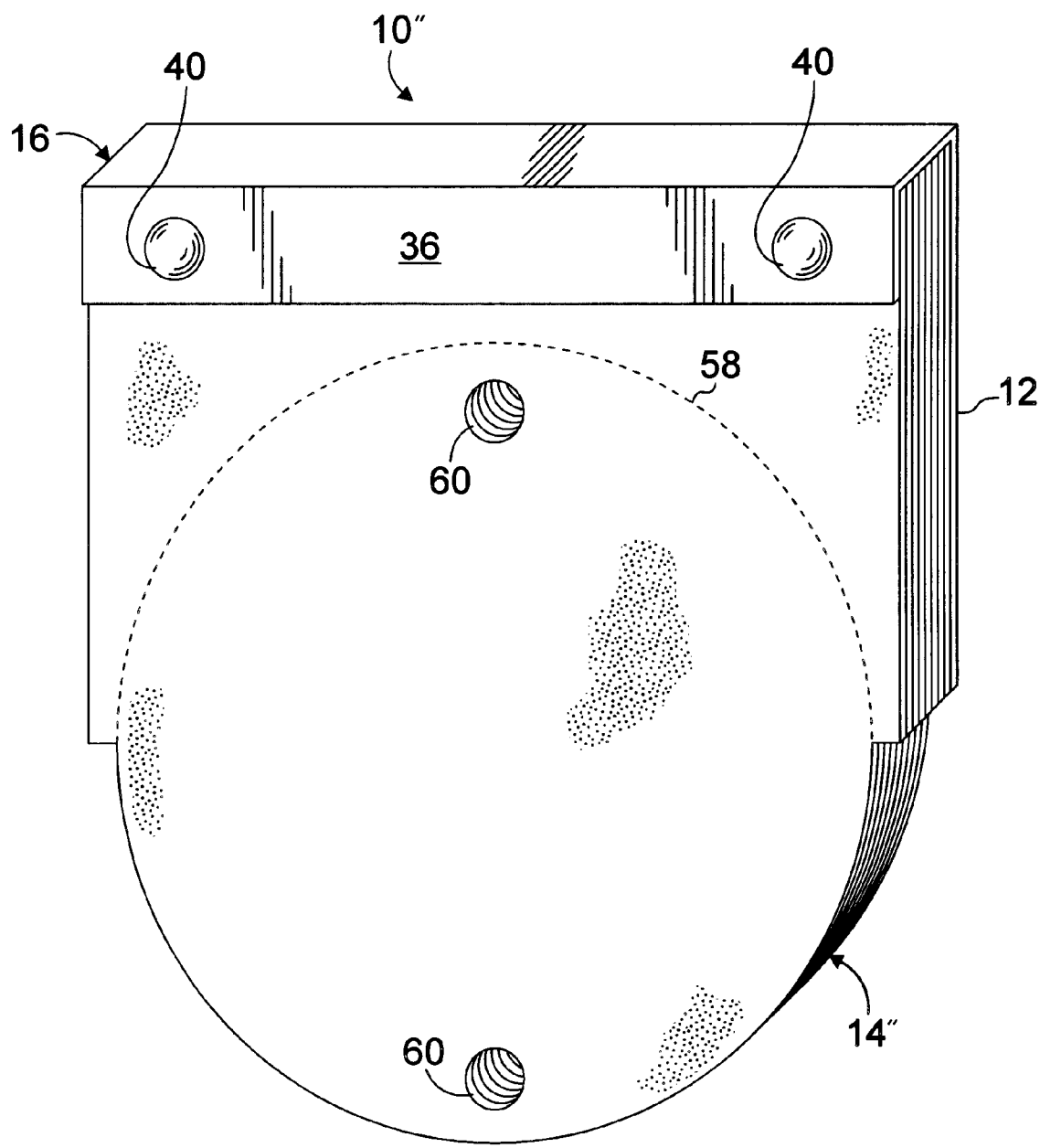
FIG. 11 is a perspective view of a further embodiment of the absorbent tablet according to the present invention.

FIG. 11 illustrates a further shape of the inventive absorbent tablet, shown at 10" in circular form. Again, the absorbent sheets 14" shown in FIG. 11 include the same properties as the absorbent sheets 14 previously described, but are cut into a different shape. The particular shape of the absorbent sheets 14" in FIG. 11 is designed for placement on the top of drum barrels, such as 55 gallon drums. The absorbent sheets 14" are removable from the absorbent tablet 10" via a weakened or perforated line 58. Upon removal, the absorbent sheets 14" are placed on the top of a drum (not shown), with the holes 60 in each absorbent sheet 14" aligned with corresponding openings formed in the drum top. The absorbent sheet 14", positioned on the drum top, quickly and efficiently absorbs and contains spills as liquid is being transferred from or to the drum, and aids in preventing and alleviating a messy and potentially dangerous situation. It should be noted that the circular portion of the absorbent sheet 14" removed for placement on a drum top constitutes only a portion of the absorbent sheet 14" used in forming the absorbent tablet 10".

Each of the absorbent sheets 14 may consist of single sheets or one or more individual mat sheets folded to form multi-layers. Upon removal of an individual sheet from the absorbent tablet 10, it may be folded open and will have a greater surface area than that of the absorbent tablet 10. For instance, a half-folded sheet would have a surface area twice as large as the absorbent tablet surface area, while a quarter-folded sheet would have a surface area four-times as large as the absorbent tablet surface area. This enables the absorbent tablet 10 to be small and compact, while still providing absorbent sheets 14 of sufficient size for cleaning purposes.

Figure 12:
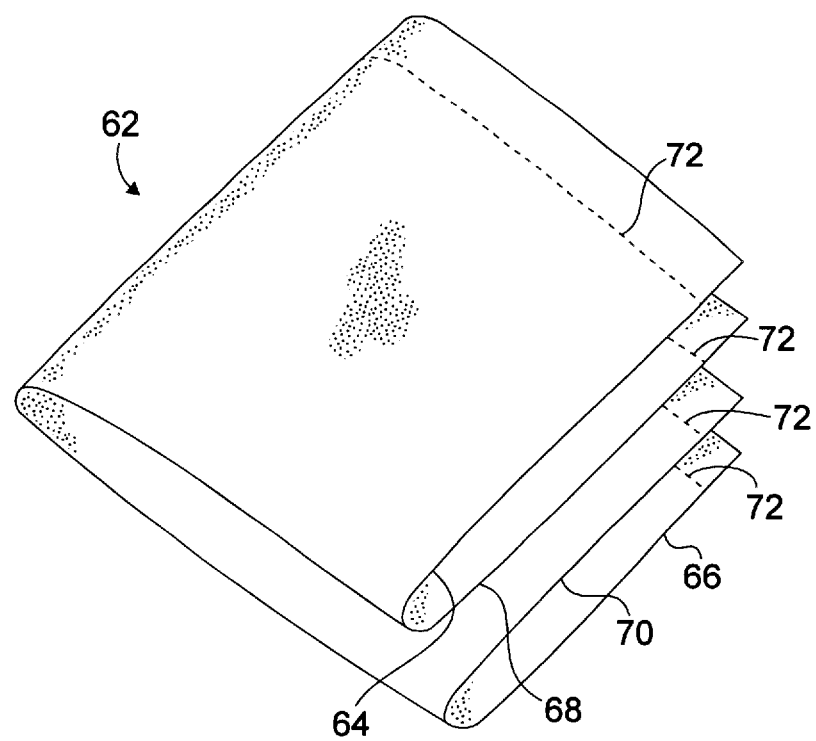
FIG. 12 is a perspective view of a quarter-folded absorbent sheet.

As shown in FIG. 12, each quarter-folded perforated sheet 62 includes two outer layers 64, 66 and two inner layers 68, 70. Weakened or perforated lines 72 are formed in each layer and are aligned with one another. The quarter-folded shields 62 are stacked one on top of the other, as shown at 73 in FIG. 13, and are bound together at the area between the perforated line 72 and sheet edge by staples 74 or any other manner as previously described to form the absorbent tablet 10.

The method of making the quarter-folded absorbent sheets, 62 will now be described with reference to FIG. 14.

Figure 13:
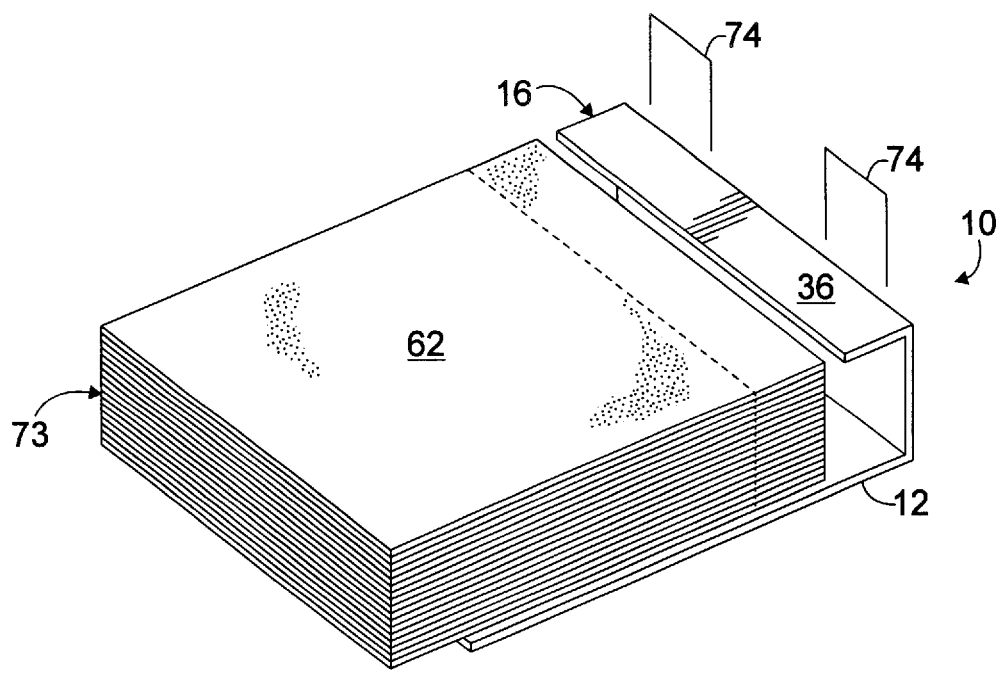
FIG. 13 is a perspective view of the inventive absorbent tablet utilizing quarter-folded absorbent sheets.

A sheet of absorbent material 78 is payed off of a roller 80 in the direction of arrow 82. As the sheet 78 moves along, perforation cutting elements 84 cut perforations 86 in the sheet of absorbent material 78 generally near the edges thereof. The perforated sheet 78 is then fed into a quarter-folding device 88, which folds and cuts the perforated sheet 78 to form the stack of quarter-folded sheets 73 as shown in FIG. 13, Specifically, the quarter-folding device 88 operates as a standard napkin folder as follows.

A half folder 90 receives the perforated sheet 78 and folds it in half lengthwise so that the perforations 86 formed in opposite edges of the sheet 78 are aligned with one another. The folded sheet exits the half folder 90 and is additionally folded in "Z" pattern, as shown at 92. The stack of "Z" folded sheets 92 is cut in half by a cutting element (not shown) along lines 93. Upon cutting, each separate half of the "Z" folded sheets forms a separate stack of quarter-folded sheets 73. Each separate stack of quarter-folded sheets 73 may he bound together in any manner as previously described to form the absorbent tablet 10.

Figure 14:
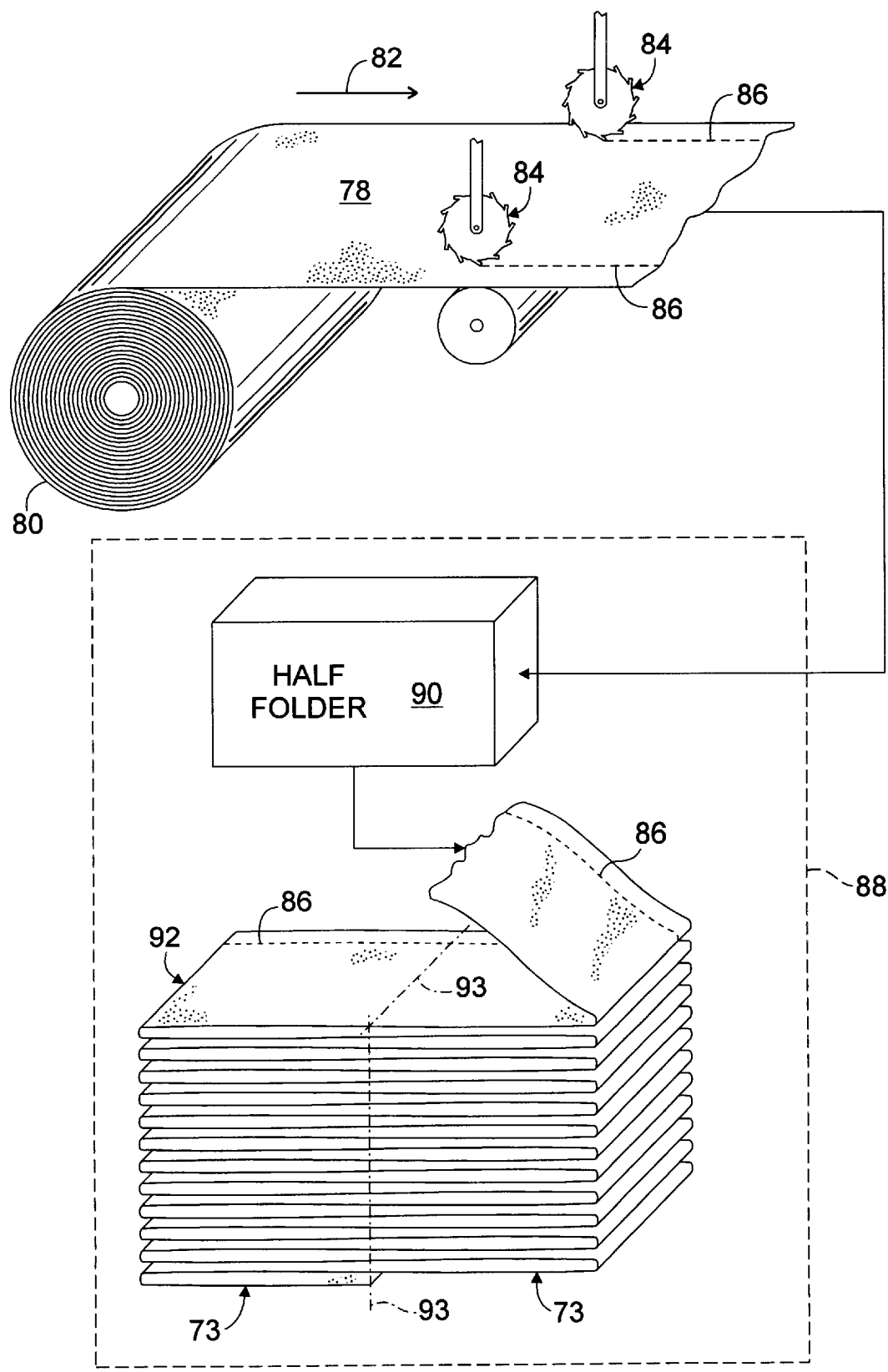
FIG. 14 is a manufacturing diagram illustrating manufacture of the quarter-folded sheets.

If half-folded absorbent sheets are desired, one of the perforation cutting clement 84 shown in FIG. 14 is removed and the sheet of absorbent material 78 is "Z" folded and cut as previously described, without the prior folding along its length by the half folder 90.

Further, to minimize waste due to the perforated edges, the quarter-folded sheets 62 may be folded by the half folder 90 so that only the outer layers 64 and 66 (see FIG. 12) need to be perforated. In this manner, one of the perforation cutting elements 84 shown in FIG. 14 is removed, and the half folder 90 folds the sheet of absorbent material 78 in half lengthwise so the non-perforated edge of the sheet 78 lies adjacent or just below the perforation 86 in the opposing edge. The "Z" folding is then performed such that the non-perforated layers of the quarter-folded sheet form the inner layers 68 and 70 (see FIG. 12).

Figure 15:
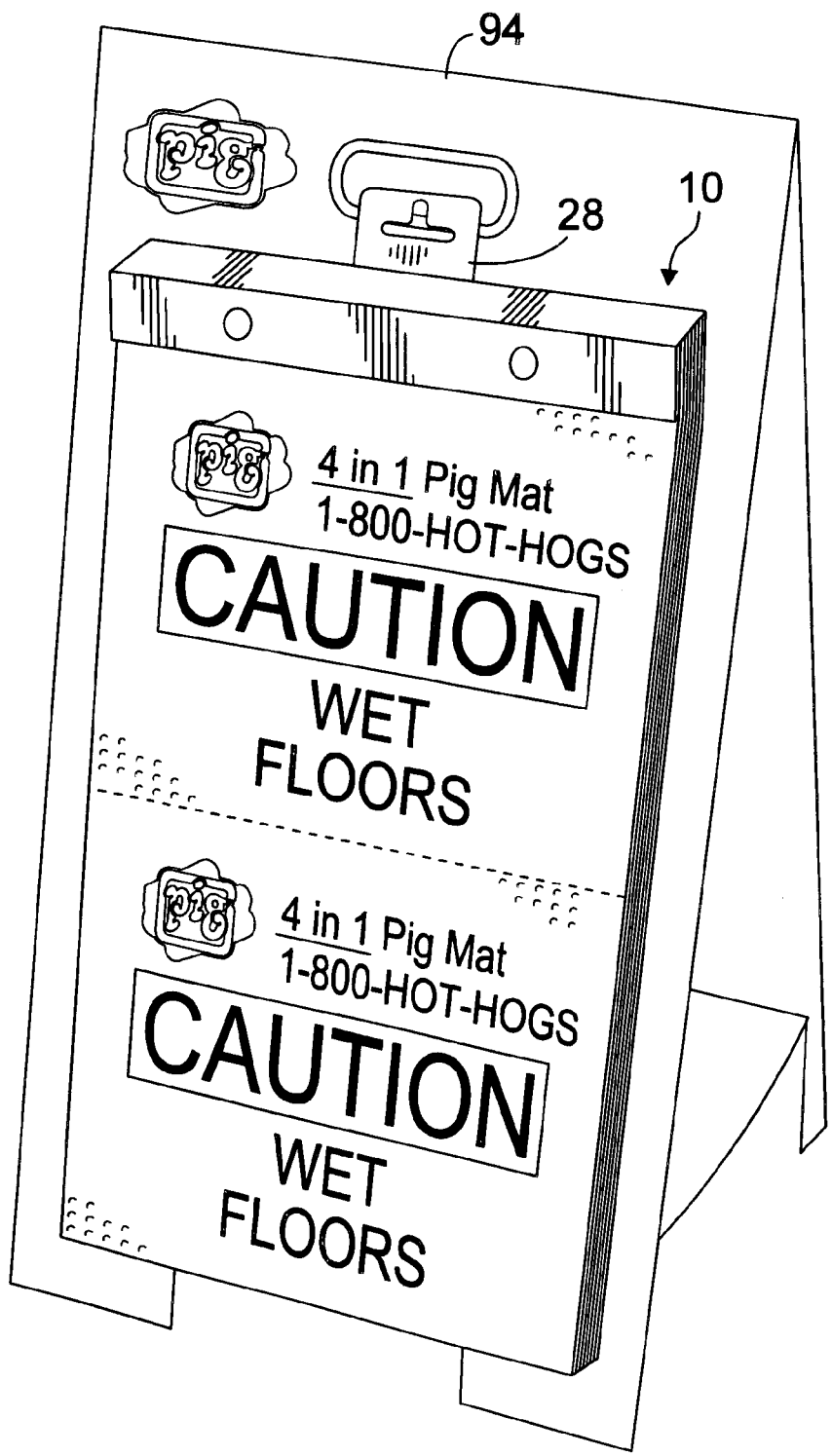
FIG. 15 is a perspective view of the absorbent tablet according to the present invention in combination with a safety sign.

FIG. 15 illustrates the inventive absorbent tablet 10 utilized in conjunction with a safety sign 94. The safety sign 94 is a self-standing floor sign generally of an A-frame construction, but may take other forms if so desired. The backing sheet 12 is slid into a mating slot (not shown) formed in one of the safety sign 94 panels to hang the absorbent tablet 10 on the safety sign 94. However, the absorbent tablet 10 may be hung on the safety sign 94 utilizing any of the hanging methods and structures previously described. In this form, the absorbent tablet 10 may be transported, along with the safety sign 94, to a location where a leak is occurring or a spill has occurred, and placed on the floor to warn individuals of the danger presented by the leak or spill. The individual absorbent sheets 14 of the absorbent tablet 10, may be torn off and utilized to contain or cleanup any spillage resulting from the leak and/or spill. If the leak is a reoccurring one, an individual has the absorbent mat sheets 14 readily available at the leak site to cleanup and help contain the leak from time to time.

It should be understood that while various uses of the inventive absorbent tablet have been described herein, the inventive absorbent tablet is capable of virtually an infinite number of uses far too numerous to mention herein. Further, depending upon the particular application for which the inventive absorbent tablet is designed, the inventive absorbent tablet may be made to virtually any size. However, for most industrial and commercial purposes, the inventive absorbent tablet generally includes a surface area in the range of 9 to 1600 square inches and a thickness in the range of $\frac{3}{8}$ to 2 inches, Still further, while the absorbent article tablet has been described herein as including absorbent sheets which may be torn off and utilized for cleaning purposes, virtually any type of absorbent article may be utilized without departing from the spirit and scope of the present invention. For example, absorbent gloves, towels, bibs, etc. may be stacked on top of one another and bound together for removal as contemplated herein to from the inventive absorbent article tablet.

While the present invention has been described with particular reference to the drawings, it should be understand that various modifications could be made without departing from the spirit and scope of the present invention.

We claim:

1. An absorbent tablet comprising:
   a plurality of absorbent sheets stacked one on top of the other, each of the plurality of absorbent sheets having moisture absorbent properties;
   a binding element disposed along one edge of the plurality of absorbent sheets the binding element having a length and securing the plurality of absorbent sheets together along its length to form a tablet; and
   at least one weakened line formed in each of the plurality of absorbent sheets and adapted to permit portions of each of the plurality of absorbent sheets to be removed from the tablet.

2. The absorbent tablet of claim 1, wherein the plurality of absorbent sheets comprise half-folded or quarter-folded absorbent sheets.

3. The absorbent tablet of claim 1, wherein the at least one weakened line comprises perforated lines.

4. The absorbent tablet of claim 1, wherein the absorbent tablet includes a surface area in the range of 9 to 1600 square inches, and a thickness in the range of $\frac{3}{8}$ to 2 inches.

5. The absorbent tablet of claim 1, further comprising:
   a substantially rigid backing sheet, the binding element attaching the backing sheet to the plurality of absorbent sheets along its length.

6. The absorbent tablet of claim 5, further comprising:
   a hanging element connected to the backing sheet for hanging the absorbent tablet at an appropriate location for use.

7. The absorbent tablet of claim 6, wherein the hanging element includes at least one magnet attached to the backing sheet for hanging the absorbent tablet on a ferromagnetic surface.

8. The absorbent tablet of claim 6, wherein the hanging element includes at least one adhesive strip on the backing sheet for attachment of the absorbent tablet to a surface.

9. The absorbent tablet of claim 6, wherein the hanging element includes at least one hole formed in the backing sheet adapted to receive a corresponding projection at the appropriate location where the absorbent tablet is to be hung.

10. The absorbent tablet of claim 6, wherein the hanging element includes a fold-out tab cut into the backing sheet, the fold-out tab having an aperture for receiving a corresponding projection at the appropriate location where the absorbent tablet is to be hung.

11. The absorbent tablet of claim 1, wherein the plurality of absorbent sheets comprise microfibrous sheet materials.

12. The absorbent tablet of claim 11, wherein the microfibrous sheet materials comprise melt blown microfibers.

13. The absorbent tablet of claim 1, wherein the plurality of absorbent sheets include indicia thereon.

14. An absorbent tablet comprising:
   a plurality of absorbent sheets stacked one on top of the other, each of the plurality of absorbent sheets having moisture absorbent properties;
   a binding element disposed along one edge of the plurality of absorbent sheets, the binding element having a length and securing the plurality of absorbent sheets together along its length to form a tablet;

at least one weakened line formed in each of the plurality of absorbent sheets and adapted to permit portions of each of the plurality of absorbent sheets to be removed from the tablet;

a substantially rigid backing sheet, the binding element attaching the backing sheet to the plurality of absorbent sheets along its length; and a hanging element connected to the backing sheet for hanging the absorbent tablet at an appropriate location for use, wherein the absorbent tablet is provided in combination with a safety sign, the absorbent tablet hung on the safety sign via the hanging element.

15. An absorbent tablet comprising:

a substantially rigid backing sheet;

a plurality of absorbent sheets stacked on top of the backing sheet, one on top of the other, each of the plurality of absorbent sheets having moisture absorbent properties;

a binding element binding the backing sheet and the plurality of absorbent sheets together along one edge thereof to form a tablet;

a weakened line formed in each of the plurality of absorbent sheets and adapted to permit each of the plurality of absorbent sheets to be removed from the tablet; and a hanging element connected to the backing sheet for hanging the absorbent tablet at an appropriate location for use.

16. The absorbent tablet of claim 15, wherein the binding element includes at least one fastener extending through the plurality of absorbent sheets and the backing sheet adjacent the one edge thereof.

17. The absorbent tablet of claim 16, wherein at least one fastener is selected from the group consisting of rivets, pins, staples, screws and wire.

18. The absorbent tablet of claim 15, wherein the binding element comprises an adhesive material disposed between the plurality of absorbent sheets and the backing sheet along the one edge thereof.

19. The absorbent tablet of claim 15, wherein the weakened line comprises a perforated line.

20. The absorbent tablet of claim 15, wherein the plurality of absorbent sheets are rectangular in shape.

21. The absorbent tablet of claim 15, wherein the absorbent tablet includes a surface area in the range of 9 to 1600 square inches, and a thickness in the range of $3/8$ to 2 inches.

22. The absorbent tablet of claim 15, wherein the hanging element includes at least one magnet or adhesive strip attached to the backing sheet for attaching the absorbent tablet to a surface.

23. The absorbent tablet of claim 15, wherein the hanging element includes a carrying handle attached to the backing sheet.

24. The absorbent tablet of claim 15, wherein the hanging element includes a fold-out tab cut into the backing sheet, the fold-out tab having an aperture for receiving a corresponding projection at the appropriate location where the absorbent tablet is to be hung.

25. The absorbent tablet of claim 15, wherein the plurality of absorbent sheets comprise microfibrous sheet materials.

26. The absorbent tablet of claim 25, wherein the microfibrous sheet materials comprise melt blown microfibers.

27. The absorbent tablet of claim 15, wherein the plurality of absorbent sheets include indicia thereon.

28. The absorbent tablet of claim 15, wherein the plurality of absorbent sheets include indicia thereon, the indicia related to a specific application of the absorbent tablet.

29. An absorbent tablet comprising:

a substantially rigid backing sheet;

a plurality of absorbent sheets stacked on top of the backing sheet, one on top of the other, each of the plurality of absorbent sheets having moisture absorbent properties;

a binding element binding the backing sheet and the plurality of absorbent sheets together along one edge thereof to form a tablet;

a weakened line formed in each of the plurality of absorbent sheets and adapted to permit each of the plurality of absorbent sheets to be removed from the tablet; and a hanging element connected to the backing sheet for hanging the absorbent tablet at an appropriate location for use, wherein the absorbent tablet is provided in combination with a safety sign, the absorbent tablet hung on the safety sign via the hanging element.

30. The absorbent tablet of claim 15, wherein the plurality of absorbent sheets comprise half-folded or quarter-folded absorbent sheets.

31. An absorbent tablet comprising:

a plurality of absorbent sheets stacked one on top of the other, each of the plurality of absorbent sheets having moisture absorbent properties, wherein the plurality of absorbent sheets include microfibrous sheet materials of melt blown microfibers; and an adhesive strip disposed along one edge of the plurality of absorbent sheets, the adhesive strip defining a spine and removeably securing the plurality of absorbent sheets together to form a tablet, wherein the plurality of absorbent sheets are directly removable from the adhesive strip such that substantially all of the absorbent sheet is removable from the absorbent tablet.

32. The absorbent tablet of claim 31, further comprising:

a substantially rigid backing sheet, the adhesive strip attaching the backing sheet to the plurality of absorbent sheets.

33. The absorbent tablet of claim 32, further comprising:

a hanging element connected to the backing sheet for hanging the absorbent tablet at an appropriate location for use.

34. An absorbent article tablet comprising:

a substantially rigid backing sheet;

a plurality of absorbent articles stacked on top of the backing sheet, one on top of the other, the plurality of absorbent articles having moisture absorbent properties;

a binding element binding the backing sheet and the plurality of absorbent articles together along one edge thereof to form a tablet;

a weakened line formed in each of the plurality of absorbent articles and adapted to permit each of the plurality of absorbent articles to be removed from the tablet; and a hanging element connected to the backing sheet for hanging the absorbent article tablet at an appropriate location for use.

35. The absorbent article tablet of claim 34, wherein the plurality of absorbent articles comprise absorbent gloves.

* * * * *